United States Patent
Jiménez et al.

(10) Patent No.: US 10,349,248 B2
(45) Date of Patent: Jul. 9, 2019

(54) MERGING PROXY

(71) Applicant: Telefonaktiebolaget LM Ericsson (publ), Stockholm (SE)

(72) Inventors: Jaime Jiménez, Helsinki (FI); Patrik Salmela, Espoo (FI); Francesco Militano, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/310,635

(22) PCT Filed: Jun. 2, 2014

(86) PCT No.: PCT/SE2014/050668
§ 371 (c)(1),
(2) Date: Nov. 11, 2016

(87) PCT Pub. No.: WO2015/187068
PCT Pub. Date: Dec. 10, 2015

(65) Prior Publication Data
US 2017/0086012 A1     Mar. 23, 2017

(51) Int. Cl.
*H04W 72/00* (2009.01)
*H04W 4/70* (2018.01)
(Continued)

(52) U.S. Cl.
CPC ............... *H04W 4/70* (2018.02); *H04W 4/80* (2018.02); *H04W 28/065* (2013.01);
(Continued)

(58) Field of Classification Search
CPC ... H04W 4/005; H04W 4/008; H04W 28/065; H04W 84/042; H04W 88/02; H04W 88/08
(Continued)

(56) References Cited

U.S. PATENT DOCUMENTS 6,324,577 B1 * 11/2001 Hirai ..................... H04L 41/00
                                                   370/254
8,065,712 B1 * 11/2011 Cheng ................. H04L 63/105
                                                   726/1
(Continued)

FOREIGN PATENT DOCUMENTS

CA          2869505 A1    11/2013
WO     2013040752 A2    3/2013

OTHER PUBLICATIONS

Author Unknown, "Technical Specification Group Services and System Aspects; Architecture enhancements to facilitate communications with packet data networks and applications (Release 11)," Technical Specification 23.682, Version 11.3.0, 3GPP Organizational Partners, Dec. 2012, 29 pages.
(Continued)

*Primary Examiner* — Marceau Milord
(74) *Attorney, Agent, or Firm* — Sage Patent Group

(57) ABSTRACT

The invention relates to a method at a network node in a communications network configured to receive messages from at least one MTC device manager intended for an MTC device, as well as the network node. The invention further relates to a network node and a method at the network node to receive messages from at least one MTC device intended for a one or more MTC device managers. In a first aspect of the present invention, a method is provided at a network node in a communications network configured to receive messages from at least one MTC device manager intended for an MTC device. The method comprises merging the received messages into at least one MTC device message, and sending the at least one MTC device message to the MTC device.

19 Claims, 9 Drawing Sheets

(51) Int. Cl.
*H04W 4/80* (2018.01)
*H04W 28/06* (2009.01)
H04W 84/04 (2009.01)
H04W 88/02 (2009.01)
H04W 88/08 (2009.01)

(52) U.S. Cl.
CPC .......... *H04W 84/042* (2013.01); *H04W 88/02* (2013.01); *H04W 88/08* (2013.01)

(58) Field of Classification Search
USPC .................................. 455/450, 550.1, 414.1
See application file for complete search history.

(56) References Cited

U.S. PATENT DOCUMENTS

| | | | | |
|---|---|---|---|---|
| 8,280,978 B2* | 10/2012 | Ansari | .................. | G06Q 30/04 709/203 |
| 8,565,160 B2* | 10/2013 | Patwardhan | .......... | H04W 60/02 370/328 |
| 8,949,997 B2* | 2/2015 | Schmidt | ................ | H04L 9/3234 726/26 |
| 9,049,104 B2* | 6/2015 | Zhu | ........................ | H04L 41/042 |
| 9,210,607 B2* | 12/2015 | Huang | .............. | H04W 28/0215 |
| 9,319,223 B2* | 4/2016 | Nix | .......................... | G06F 21/35 |
| 9,444,752 B2* | 9/2016 | Backholm | ................ | H04L 47/32 |
| 9,596,668 B2* | 3/2017 | Yoon | .................. | H04W 56/0015 |
| 9,693,257 B2* | 6/2017 | Huang | .............. | H04W 28/0215 |
| 9,961,584 B2* | 5/2018 | Alisawi | ............. | H04W 28/0215 |
| 10,104,492 B2* | 10/2018 | DiGirolamo | ............ | H04L 67/12 |
| 2002/0181501 A1* | 12/2002 | Nova | .................... | G08B 25/003 370/467 |
| 2008/0228908 A1* | 9/2008 | Link | ..................... | H04L 41/046 709/223 |
| 2011/0004649 A1* | 1/2011 | Nord | ................... | H04L 67/306 709/202 |
| 2011/0213871 A1* | 9/2011 | DiGirolamo | ............ | H04W 4/00 709/223 |
| 2012/0188876 A1* | 7/2012 | Chow | .................. | H04W 48/08 370/237 |
| 2012/0331087 A1* | 12/2012 | Luna | .................. | H04L 67/2842 709/213 |
| 2013/0013741 A1* | 1/2013 | Norp | ..................... | H04W 4/005 709/219 |
| 2013/0013792 A1* | 1/2013 | Norp | ..................... | H04W 4/005 709/227 |
| 2013/0016657 A1* | 1/2013 | Muhanna | .............. | H04W 4/005 370/328 |
| 2013/0024556 A1* | 1/2013 | Zhu | ........................ | H04L 41/042 709/223 |
| 2013/0157653 A1* | 6/2013 | Huang | .............. | H04W 28/0215 455/423 |
| 2013/0188515 A1* | 7/2013 | Pinheiro | ............... | H04W 4/001 370/254 |
| 2013/0291100 A1* | 10/2013 | Ganapathy | .............. | H04W 4/70 726/22 |
| 2014/0115574 A1* | 4/2014 | Valentine | ................ | H04L 67/34 717/172 |
| 2014/0126581 A1* | 5/2014 | Wang | .................... | H04W 4/001 370/431 |
| 2014/0153489 A1* | 6/2014 | Perras | .................... | H04W 60/00 370/328 |
| 2014/0198738 A1* | 7/2014 | Huang | .................. | H04W 4/005 370/329 |
| 2014/0359035 A1* | 12/2014 | Wang | ..................... | H04L 51/06 709/206 |
| 2015/0009818 A1* | 1/2015 | Xiao | ...................... | H04W 4/12 370/230.1 |
| 2015/0019686 A1* | 1/2015 | Backholm | ............... | H04L 47/32 709/217 |
| 2015/0143125 A1* | 5/2015 | Nix | ................... | H04W 52/0235 713/171 |
| 2015/0180847 A1* | 6/2015 | Nix | ....................... | H04L 9/0869 713/168 |
| 2015/0358824 A1* | 12/2015 | Kim | ..................... | H04W 4/005 726/4 |
| 2016/0088049 A1* | 3/2016 | Seed | ...................... | H04W 4/70 709/203 |
| 2016/0227496 A1* | 8/2016 | Panteleev | ............. | H04W 76/18 |
| 2017/0201411 A1* | 7/2017 | Mladin | ................. | H04L 41/042 |

OTHER PUBLICATIONS

International Search Report and Written Opinion for International Patent Application No. PCT/SE2014/050668, dated Feb. 23, 2015, 4 pages.
Examination Report for European Patent Application No. 14737049.8, dated Dec. 13, 2017, 7 pages.
Examination Report for European Patent Application No. 14737049.8, dated Aug. 28, 2018, 5 pages.

* cited by examiner

MERGING PROXY

This application is a 35 U.S.C. § 371 national phase filing of International Application No. PCT/SE2014/050668, filed Jun. 2, 2014, the disclosure of which is incorporated herein by reference in its entirety.

TECHNICAL FIELD

The invention relates to a method at a network node in a communications network configured to receive messages from at least one MTC device manager intended for an MTC device, as well as the network node. The invention further relates to a network node and a method at the network node to receive messages from at least one MTC device intended for an MTC device manager. The invention further relates to computer programs performing the methods according to the present invention, and computer program products comprising computer readable medium having the computer programs embodied therein.

BACKGROUND

Over the last years, a concept known as the Internet of Things (IoT) has emerged. Generally, IoT comprises a huge number of small autonomous devices, which typically, more or less infrequently (e.g. once per week to once per minute) transmit and receive only small amounts of data, or are polled for data. These devices are sometimes referred to as Machine Type Communication (MTC) devices, Machine-to-Machine (M2M) devices or just Machine Devices (MDs), and are assumed not to be associated with humans, but are rather sensors or actuators of different kinds, which typically communicate with application servers (which configure and receive data from the devices) within or outside the cellular network.

With the nature of MTC devices and their assumed typical uses follow that these devices generally will have to be energy efficient, since external power supplies not necessarily are available and since it is neither practically nor economically feasible to frequently replace or recharge their batteries. In some scenarios the MTC devices may not even be battery powered, but may instead rely on energy harvesting, i.e. gathering energy from the environment, opportunistically utilizing (the often very limited) energy that may be tapped from sun light, temperature gradients, vibrations, etc. Sleep cycles are commonly used for the MTC device in order to conserve power.

So far, the MTC related work in 3rd Generation Partnership Project (3GPP) has focused on MTC devices directly connected to the cellular network via the radio interface of the cellular network. However, a scenario which is likely to be more prevalent is that most MTC devices connect to the cellular network via a gateway. In such scenarios the gateway acts like a User Equipment (UE) towards the cellular network while maintaining a local network, typically based on a short range radio technology towards the MTC devices. Such a local network, which in a sense extends the reach of the cellular network (to other radio technologies but not necessarily in terms of radio coverage) has been coined capillary network and the gateway connecting the capillary network to the cellular network is thus referred to as a capillary network gateway (CGW). Hence, the capillary network comprises one or more CGWs and a plurality of MTC devices, which connect to a Radio Access Network (RAN) of an available cellular communications network via the one or more CGWs.

Radio technologies that are expected to be common in capillary networks include e.g. IEEE 802.15.4 (e.g. with IPv6 over Low power Wireless Personal Area Networks (6LoWPAN) or ZigBee as higher layers), Bluetooth Low Energy or low energy versions of the IEEE 802.11 family (i.e. Wi-Fi). Generally, the CGW is under the control of the operator of the cellular network (even though the cellular network operator not necessarily owns the CGW). There are multiple protocols that can be used for managing the devices in a capillary network, such as Simple Network Management Protocol (SNMP) and Open Mobile Alliance (OMA) Lightweight Implementation (LWM2M). In these structures, multiple MTC devices are controlled by a number of managers, where the managers typically communicate with an agent running at the respective MTC device.

Sending commands to the MTC devices from the managers requires the MTC device to listen, either actively (i.e. the device "pulls" the commands from the manager) or passively (i.e. the manager "pushes" the commands onto the device), for the incoming commands. Regardless of if push or pull transfer is utilized, the MTC devices will inevitably consume power to acquire the commands and carry out instructions accordingly. Further, some MTC devices may have multiple managers (e.g. a sensor which reports temperature may be polled for the latest reading by multiple users via multiple managers), which can lead to excessive signalling with the device, some of which might be duplicate or contradictory commands. This results in inefficient use of the limited resources of the MTC device.

SUMMARY

An object of the present invention is to solve or at least mitigate this problem in the art and to provide an improved method and network node for communicating with an MTC device.

This object is attained in a first aspect of the present invention by a method at a network node in a communications network configured to receive messages from at least one MTC device manager intended for an MTC device. The method comprises merging the received messages into at least one MTC device message, and sending the at least one MTC device message to the MTC device.

This object is attained in a second aspect of the present invention by a network node in a communications network configured to manage messages from at least one MTC device manager intended for an MTC device. The network node comprises a processing unit and a memory, which memory contains instructions executable by the processing unit, whereby said network node is operative to receive the messages from the at least one MTC device manager, merge the received messages into at least one MTC device message, and send the at least one MTC device message to the MTC device.

Further provided are computer programs performing the methods according to the present invention, and computer program products comprising computer readable medium having the computer programs embodied therein.

Advantageously, with embodiments of the present invention, signalling from the MTC device managers to the MTC devices is improved in that information, such as e.g. duplicate information, conflicting information and/or outdated information is removed before the received messages are merged into one or more messages to be sent to the MTC device. As an example, the duplicate information could be in the form of a group of identical control commands intended for an MTC device, the conflicting information could comprise conflicting instructions received from different MTC device managers, while the outdate information could be instructions for which a certain time period has expired.

In an embodiment of the present invention, in case duplicate information in the form of a plurality of identical commands are received at the network node, being for instance a proxy, all but one of the identical commands are removed, wherein the single remaining command is included in the MTC device message which is sent to the MTC device. This approach advantageously facilitates power conserving at the MTC device, since the MTC device need not wake up and act on several identical commands. The proxy needs to keep track of the received commands, also those that are removed, such that a reply subsequently can be sent to all the MTC device managers that originally sent a command intended for the MTC device.

The network node according to embodiments of the present invention could be implemented for instance as a separate proxy, but could alternatively be implemented at a manager for the MTC devices for merging messages to be sent to the MTC devices. Further, the network node could reversely act as a merging device for messages sent from the MTC devices towards one or more managers. Thus, further provided in aspects of the present invention are a network node and a method at the network node of managing messages from at least one MTC device intended for an MTC device manager.

The network node preferably supports multiple different management protocols, such as e.g. SNMP and LWM2M, and is capable of translating between the protocols and the protocol supported by the MTC device. For example, management commands received over the Internet may comply with SNMP while LWM2M is used locally at the MTC devices.

In another embodiment of the present invention, the network node is advantageously configured to resolve conflicting information of the messages received from the MTC device managers. The merging of the received messages into the MTC device message(s) will thus be undertaken with conflicts resolved. For instance, in one embodiment, conflicting information is removed from the messages received from the MTC device manager(s) before the received messages are merged into a message to be sent to the MTC device. In another embodiment, where the conflicting information comprises conflicting instructions to the MTC device, one conflicting instruction is given priority over the other(s) and is merged into the message to be sent to the MTC device.

In an example, a first manager sets a sleep cycle of the MTC device to 30 minutes, while a second manager sets the sleep cycle to 27 minutes. In such a case, both commands can not be fulfilled successfully. Therefore, prioritization must be utilized; e.g. first come-first served, last received command is used, the first manager has higher priority than the second manager, etc.). Preferably, a message is sent to the manager whose command is not fulfilled, providing the manager with the current MTC device setting as determined by the proxy.

In yet another embodiment of the present invention, outdated information included in the received messages is removed such that the received messages are merged into one or more MTC device messages with the outdated information removed. To determine whether information is outdated, a timing indicator can be included in the received messages to indicate the lifetime of one or more pieces of information included in the messages.

Thus, with embodiments of the present invention, energy consumption of the MTC devices may advantageously be reduced. As has been explained hereinabove, MTC device management protocols in the art are sometimes based on synchronous communication between manager and MTC device, where acknowledgements are expected at the manager side for the commands and instruction that have been issued. This is not feasible for MTC devices, since they have very limited power supply capacity and hence cannot be expected to be continuously up and running. To overcome such problems, MTC devices could be configured to fetch management commands and instructions only when possible and in bulk. Thereafter, the MTC device will perform whichever tasks are required, respond and finally go back to sleep.

However, even if the management protocol would support the pull-based approach for fetching data at the MTC device, the amount of accumulated commands may grow big and may further contain duplicate and/or contradicting commands, e.g. instructions to change sleep cycle with two different values, reading the same resource multiple times, receiving conflicting write commands from multiple managers, etc.

Embodiments of the present invention solves these problems in that art in that information comprising instructions to the MTC device are merged or aggregated in order to avoid duplicate information to which the MTC device must respond and/or to resolve conflicts being a result of conflicting instructions, in order to limit the amount of instructions received by the MTC device. Further, in case an MTC device is in a sleep cycle, a message received when the MTC device exits the sleep cycle may be useless since the instructions contained in the message already are outdated.

The merging of messages received from one or more MTC device managers into one or more messages sent to an MTC device may thus include e.g. removing duplicate information, resolving conflicting information or removing outdated information, or any combination of two or more of these three actions.

Generally, all terms used in the claims are to be interpreted according to their ordinary meaning in the technical field, unless explicitly defined otherwise herein. The steps of any method disclosed herein do not have to be performed in the exact order disclosed, unless explicitly stated. It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
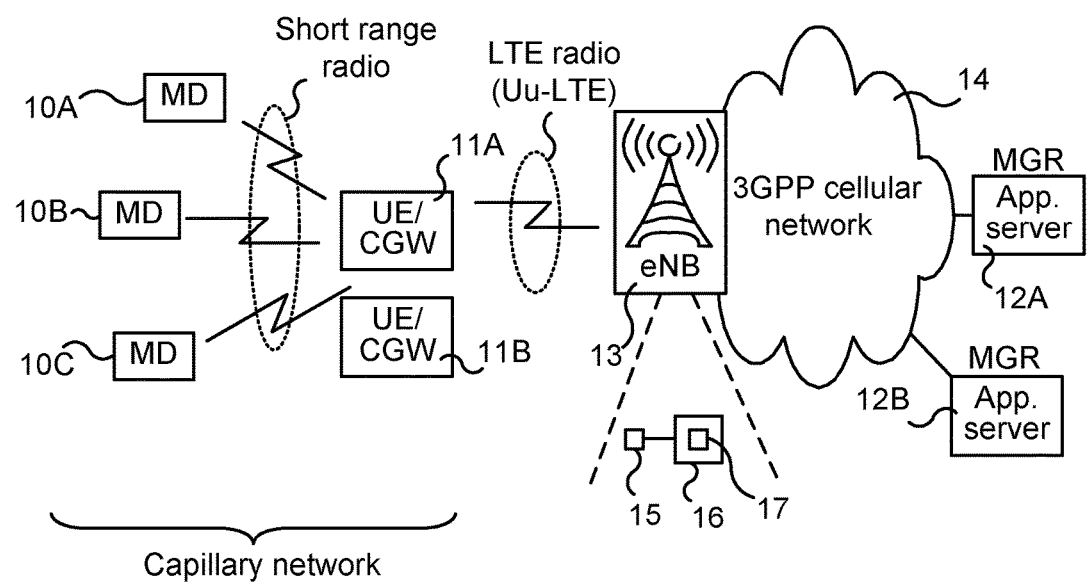
FIG. 1 illustrates a prior art capillary network in which embodiments of the present invention can be implemented.

FIG. 1 illustrates a prior art capillary network in which embodiments of the present invention can be implemented. A number of wireless devices referred to as Machine Devices (MDs) or Machine Type Communication (MTC) devices 10A, 10B, 10C connect to one or more Capillary Network Gateways (CGWs) 11A, 11B, typically via short range radio communication such as Near Field Communications (NFC), Radio-Frequency Identification (RFID), Wireless Local Area Network (WLAN), Bluetooth or any technology utilizing the IEEE 802.15.4 standard, such as ZigBee or MiWi. The capillary network may for instance be implemented in a factory setting where the MTC devices 10A, 10B, 10C could amount to hundreds or even thousands of sensors for measuring physical properties (such as temperature, pressure, energy consumption, etc.) of an industrial process and reporting via the CGWs 11A, 11B in the form of Wi-Fi Access Points (APs) to one or more application servers 12A, 12B via an eNodeB 13 of a RAN in an LTE network 14. MTC device managers are typically implemented at the application servers 12A, 12B. A network may comprise a plurality of MTC device managers. The network node according to embodiments of the present invention configured to merge information received from one or more MTC device managers to create a more efficient message in terms of information content could be implemented in any appropriate network node depending on the particular use case, such as at any, or both, of the CGWs 11A, 11B, at the eNodeB 13 or any suitable node in the 3GPP cellular network 14, or could even be integrated with the MTC device managers implemented in the application servers 12A, 12B.

In an exemplifying embodiment, the network node is implemented at the eNodeB 13 acting as a proxy between the MTC managers/application servers 12A, 12B and the MTC devices 10A, 10B, 10C. In the following, the network node according to embodiments of the present invention will occasionally be referred as "the proxy" 13.

With further reference to FIG. 1, the network node of embodiments of the present invention is exemplified to be implemented in the eNodeB/proxy 13. In practice, the method of merging messages received from the MTC device managers 12A, 12B intended for the MTC devices 10A, 10B, 10C is performed by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. Thus, as is illustrated by means of dashed lines in FIG. 1, the processing unit 15 and the storage medium are included in the proxy 13. The processing unit 15 is arranged to carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a Digital Versatile Disc (DVD) or a memory stick. As a further alternative, the computer program 17 may be downloaded to the storage medium 16 over a network. The processing unit 15 may alternatively be embodied in the form of a digital signal processor (DSP), an application specific integrated circuit (ASIC), a field-programmable gate array (FPGA), a complex programmable logic device (CPLD), etc. Further, even though not shown in FIG. 1, the MTC devices typically comprise a corresponding processing unit and memory unit comprising a computer program executable by the processing unit.

Figure 2A:
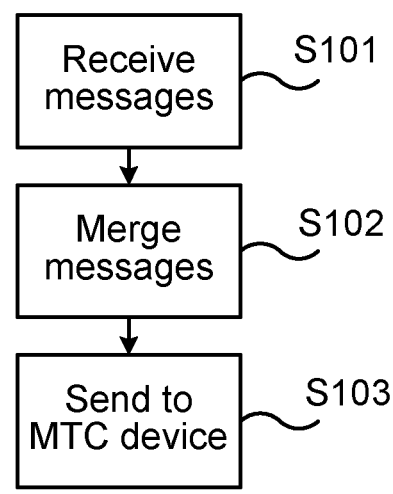
FIGS. 2A-E illustrate flowcharts of various embodiments of the method according to the present invention.

FIG. 2A illustrates a flowchart of an embodiment of the method according to the present invention. Reference is further made to network elements shown in FIG. 1. In the flowchart, it is assumed that the MTC device manager 12A sends multiple messages to the MTC device 10A, even though in practice, a number of MTC device managers send numerous messages to a plurality of MTC devices to be handled by the proxy 13 according to embodiments of the invention. Thus, in a first step S101, the proxy 13 receives messages from the MTC device manager 12A intended for the MTC device 10A. In the following step S102, the received messages are merged into at least one MTC device message. Thus, when merging the messages received from the manager 12A into one or more MTC device messages, information not necessary for the MTC device 10A is removed. Finally, in step S103, the proxy 13 sends the MTC device message(s) to the MTC device 10A. Advantageously, the MTC device 10A does not need to act on the potentially superfluous information initially sent from the manager 12A to the proxy 13, but only on the information comprised in the MTC device message resulting from the merging of the messages originally sent by the manager 12A.

With further reference to FIG. 2A, the situation could be the reverse, where the MTC device 10A sends multiple messages to the MTC device manager 12A. Thus, in the first step S101, the proxy 13 receives messages from the MTC device 10A intended for the MTC device manager 12A. In the following step S102, the received messages are merged into at least one MTC device manager message. Thus, when merging the messages received from the MTC device 10A into one or more MTC device manager messages, information not necessary for the MTC device manager 12A is removed. Finally, in step S103, the proxy 13 sends the MTC device manager message(s) to the MTC device manager 12A. Advantageously, the MTC device manager 12A does not need to act on the potentially superfluous information initially sent from the MTC device 10A to the proxy 13, but only on the information comprised in the MTC device manager message resulting from the merging of the messages originally sent by the MTC device 10A.

In case a number of MTC device managers 12A, 12B sends instructions to the MTC device 10A via the proxy 13, the proxy 13 should remember which managers that actually requested this information and send a response message to each of them comprising the MTC device information originally requested by the MTC device managers.

Figure 2B:
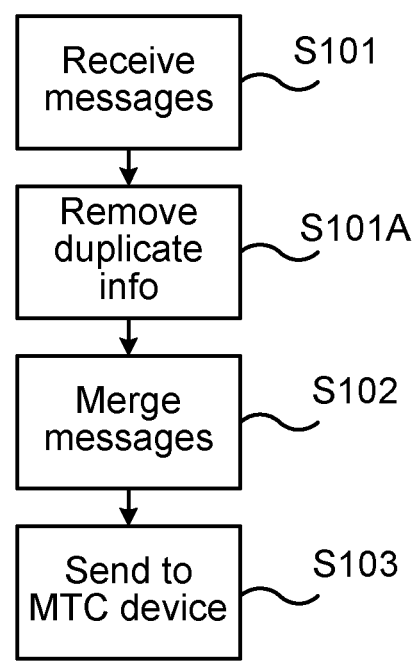

FIG. 2B illustrates a flowchart of an embodiment of the method according to the present invention. Reference is further made to network elements shown in FIG. 1. In the flowchart, it is assumed that the MTC device manager 12A sends multiple messages to the MTC device 10A, even though in practice, a number of MTC device managers send numerous messages to a plurality of MTC devices to be handled by the proxy 13 according to embodiments of the invention. Thus, in a first step S101, the proxy 13 receives messages from the MTC device manager 12A intended for the MTC device 10A. In the received messages, there may be duplicate information. Assuming for instance that the MTC device 10A is a thermometer measuring and reporting indoor temperature; the manager 12A thus sends an instruction that the thermometer should report the indoor temperature. In this particular example, four messages are sent to the proxy 13 where two of the messages comprise the instruction to report the indoor temperature. The proxy 13 will thus remove one of these duplicate instructions included in the received messages in step S101A. In the following step S102, the received messages are merged, with the duplicate information removed, into at least one MTC device message. Thus, when merging the messages received from the manager 12A into one or more MTC device messages, there are no longer any redundant instructions included. Finally, in step S103, the proxy 13 sends the MTC device message(s) to the thermometer 10A. Advantageously, the thermometer 10A does not need to act on the duplicate instructions initially sent from the manager 12A to the proxy 13, but only to the single instruction comprised in the MTC device message resulting from the merging of the messages originally sent by the manager 12A.

In an embodiment, the proxy 13 sends in step S101 a confirmation to the manager 12A that the messages have been received and will be sent to the MTC device 10A after having been merged together.

Figure 2C:
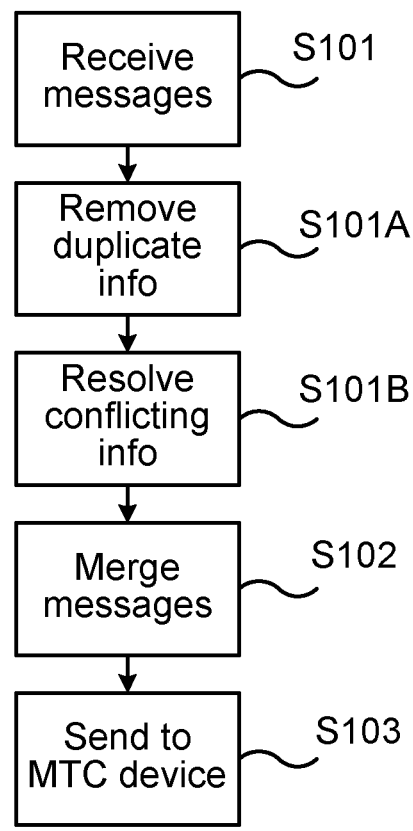

FIG. 2C illustrates a flowchart of a further embodiment of the method according to the present invention. Reference is further made again to network elements shown in FIG. 1. In the flowchart, it is assumed that both MTC device managers 12A, 12B send multiple messages to the MTC device 10A. Thus, in a first step S101, the proxy 13 receives messages from first and second MTC device manager 12A, 12B intended for the MTC device 10A. As in the embodiment described with reference to FIG. 2B, any duplicate information is removed from the received messages in step S101A. Again assuming that the MTC device 10A is a thermometer measuring and reporting indoor temperature; the first manager 12A sends an instruction that the thermometer should set its sleep cycle such that it wakes up, say every 17 seconds, while the second manager sends an instruction that the thermostat should wake up every 30 seconds. Selecting either one of these will only help one of the MTC device managers while the other one will not be in alignment with the thermometer. To solve this issue there could be different priority levels for different managers, such that instructions from a first manager with higher priority will override instructions of a second manager with lower priority.

The proxy 13 will thus need to resolve the conflicting information included in the received messages in step S101B. This could be done by having the proxy 13 select one of the managers 12A, 12B, for instance the first manager 12A. Thus, the sleep cycle-setting instruction from the second manager 12B is removed, and in step S102, the instructions to set the sleep cycle from the first manager 12A is merged, along with other information to be sent to the thermometer 10A and with duplicate information removed, into one or more MTC device messages to be sent to the thermometer 10A. Thus, when merging the messages received from the managers 12A, 12B into one or more MTC device messages, there are no longer any conflicting instructions included. Finally, in step S103, the proxy 13 sends the MTC device message(s) to the thermostat 10A. Advantageously, the thermostat 10A does not need to act on conflicting instructions initially sent from the two managers 12A, 12B to the proxy 13, but only to the single instruction to set the temperature comprised in the MTC device message resulting from the merging of the messages originally sent by the two managers 12A, 12B.

In an embodiment, the proxy 13 signals the manager 12B with lower priority of the refusal to perform the instruction initially sent and also give the reason for it (command overridden by higher priority manager 12A) and the configuration instructed by the manager 12A with the higher priority so the other manager 12B can adjust to the new configuration.

In another embodiment, the resolving of conflicting information performed by the proxy 13 in step S101B could be undertaken by removing the conflicting information from the received messages, if that would better suit the particular situation. In such a case, the MTC device 10A would typically continue to use its current configuration, which optionally may be reported by the proxy 13 to the MTC device managers 12A, 12B.

Figure 2D:
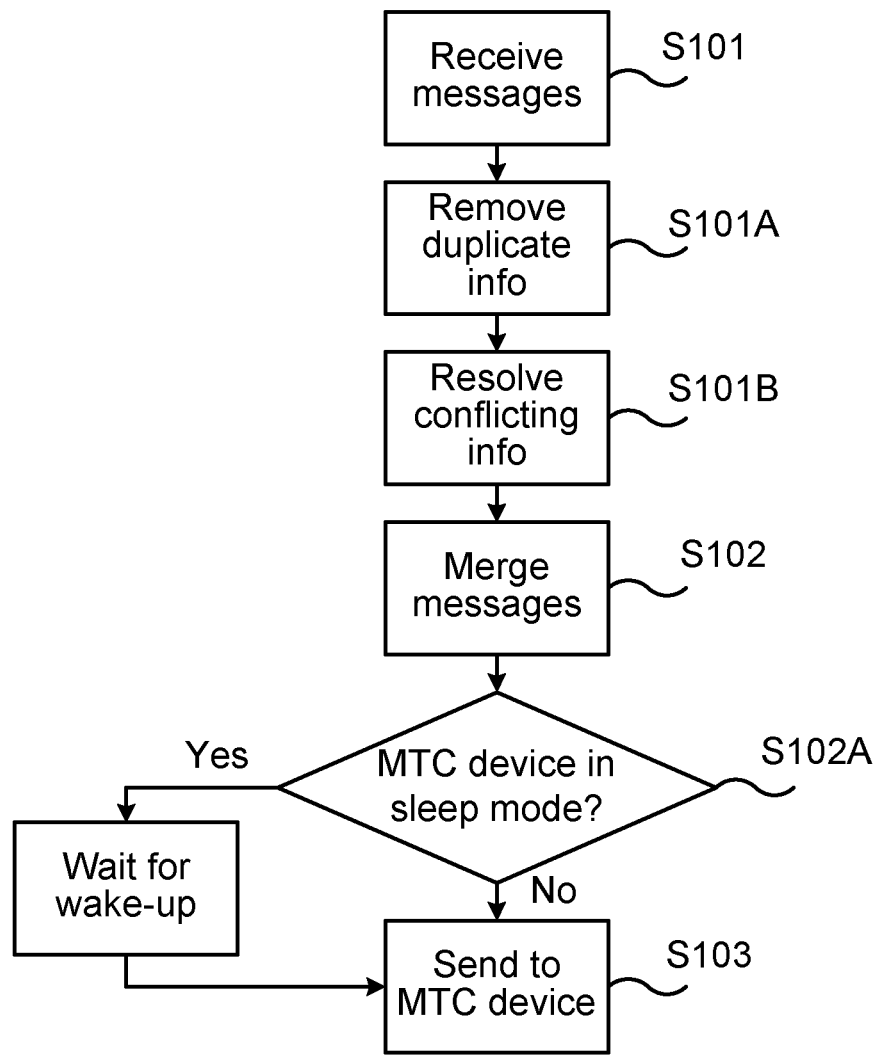

FIG. 2D illustrates a flowchart of a further embodiment of the method according to the present invention. In this embodiment, in addition to removing duplicate information received from the MTC device managers 12A, 12B, as is done in step S101A of FIGS. 2B and 2C and conflicting information (as in step S101B of FIG. 2C), and merging the messages with the duplicate (and also possibly conflicting) information removed in step S102, a further step is introduced. The proxy 13 determines in step S102A whether the thermometer 10A is in a sleep mode; if that is the case, the proxy 13 will wait until the thermometer 10A wakes up before sending the message in step S103, otherwise it can send the message instantly.

Figure 2E:
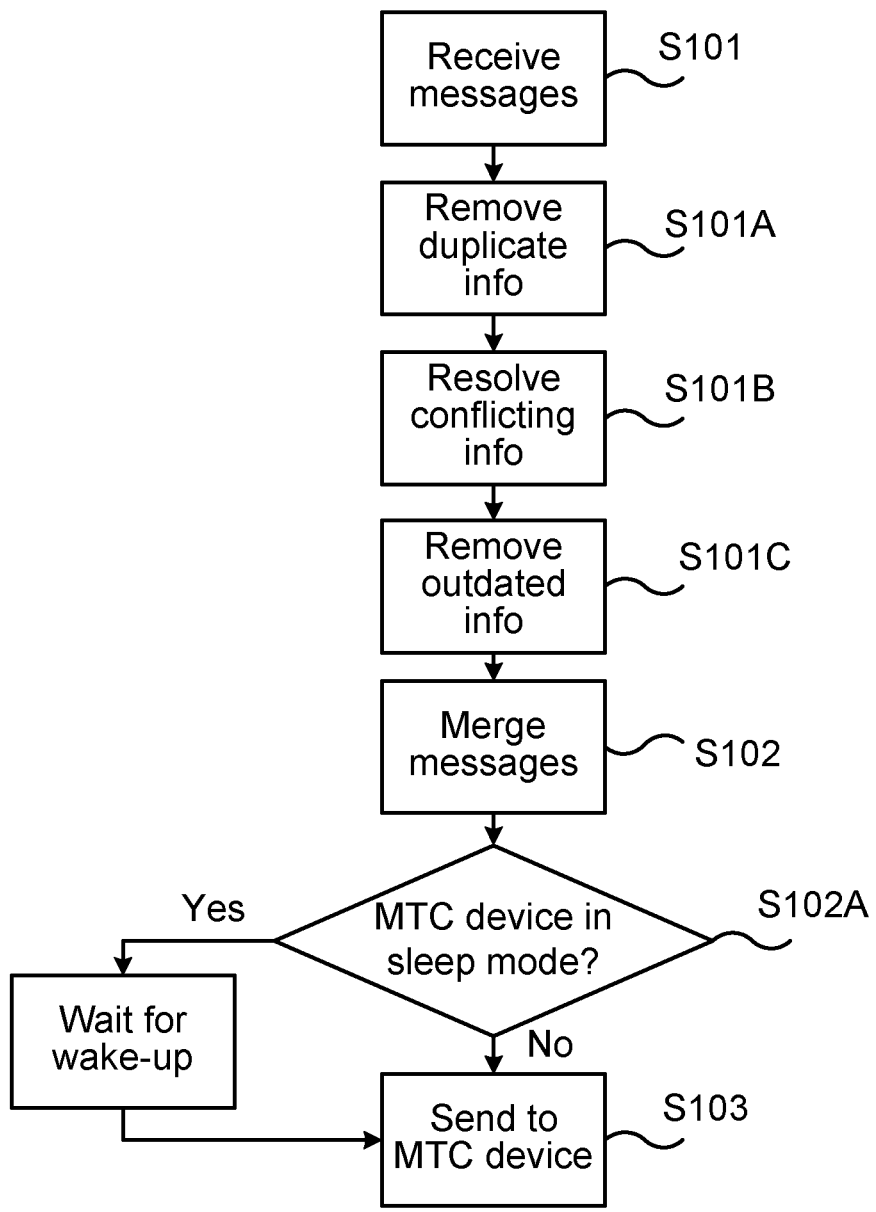

FIG. 2E illustrates a flowchart of a further embodiment of the method according to the present invention. In this embodiment, in addition to removing duplicate information in step S101A, and resolving conflicting information in step S101B, from the messages received from the MTC device managers 12A, 12B in step S101, the proxy 13 further removes any outdated information in step S101C before merging the messages to be sent to the MTC devices 10A, 10B, 10C in step S102. Thus, the outdated information included in the received messages is removed such that the received messages are merged into one or more MTC device messages with the outdated information removed. To determine whether information is outdated, a timing indicator can be included in the received messages to indicate the lifetime of one or more pieces of information included in the messages. Thereafter, as in the previous embodiment, the proxy 13 determines whether the MTC device 10A to receive the merged messages is in a sleep mode in step S102A before sending the merged messages to the MTC device 10A in step S103.

Advantageously, since the information from the managers 12A, 12B are sent via the proxy 13, which will deliver merged messages to the MTC device 10A once it is woken up, it might be that an instruction given by a manager 12A, 12B is not relevant anymore when the MTC device 10A exits sleep mode. Consequently, the proxy 13 can drop cached instructions when their lifetime expires. The lifetime could be set to be unlimited, if desired.

In practice, when the proxy 13 merges the information from the MTC device managers, it may need to keep track of the management protocols used by each manager to be able to comply with the protocols when subsequently returning requested information from the MTC devices to the managers. Moreover, the proxy may respond to the managers with a confirmation that the instructions have been received orderly and will be delivered. If such a confirmation is not received, the MTC device manager(s) may have to resend the instructions.

In yet an embodiment, the proxy 13 determines whether an MTC device manager 12A, 12B is authorized to communicate with an MTC device 10A, 10B, 10C before any messages are merged from the manager in step S103 throughout FIGS. 2A-E. This can be undertaken in a variety of different ways, such as the proxy 13 authorizing a digitally signed message by the manager.

As can be concluded from the above, a number of advantages are brought about by the embodiments of the present invention:

"Mailbox" for MTC devices; one of the main functionalities of the proxy is to cache instructions for the MTC devices, while the MTC devices are in their sleep mode and to deliver the instructions when the MTC devices wake up. Advantageously, the proxy merges the messages received from one or more MTC device managers and when command overlaps occur, the proxy sends only the merged information to the MTC devices.

Priority handling; different instructions and/or MTC device managers can be prioritized either explicitly (tagging messages) or implicitly via message types. The proxy can then for example merge instructions that are not prioritized and report them in bulk after some time. If responses are prioritized, they could be given precedence.

Instruction tagging; instructions can be tagged according to priority, lifetime (certain instructions are only interesting for a certain time period), level of authority, access control policy, etc.

Translation of instruction; due to the various management protocols available, the proxy should offer some instruction translation. Therefore the proxy should know the protocol configuration of the MTC devices and their managers in order to adapt the instructions in case a manager and an MTC device use different protocols. For instance, if an instruction is not applicable, it should report the error back to the manager.

It should be noted that the merging of messages received from one or more MTC device managers 12A, 12B into one or more messages sent to an MTC device 10A, 10B, 10C may include any one or more of the steps of removing duplicate information (step S101A), resolving conflicting information (S101B) or removing outdated information (step S101C), or any combination of two or more of these three actions. The actions may further be undertaken in any order. For instance, the step of resolving conflicting information in step S101B may be undertaken prior to the step of removing duplicate information in step S101A.

Further, throughout the embodiments described with reference to FIGS. 2A-E, the proxy 13 needs to keep track of which instruction came from which MTC device manager 12A, 12B. When multiple managers e.g. request the temperature of the thermometer 10A, the thermometer only receives one request (as described hereinbove; duplicate instructions are removed) from the proxy 13, and only sends one reply to the request. Now, the proxy 13 should remember which managers that actually requested this information and send a response message to each of them.

Figure 3:
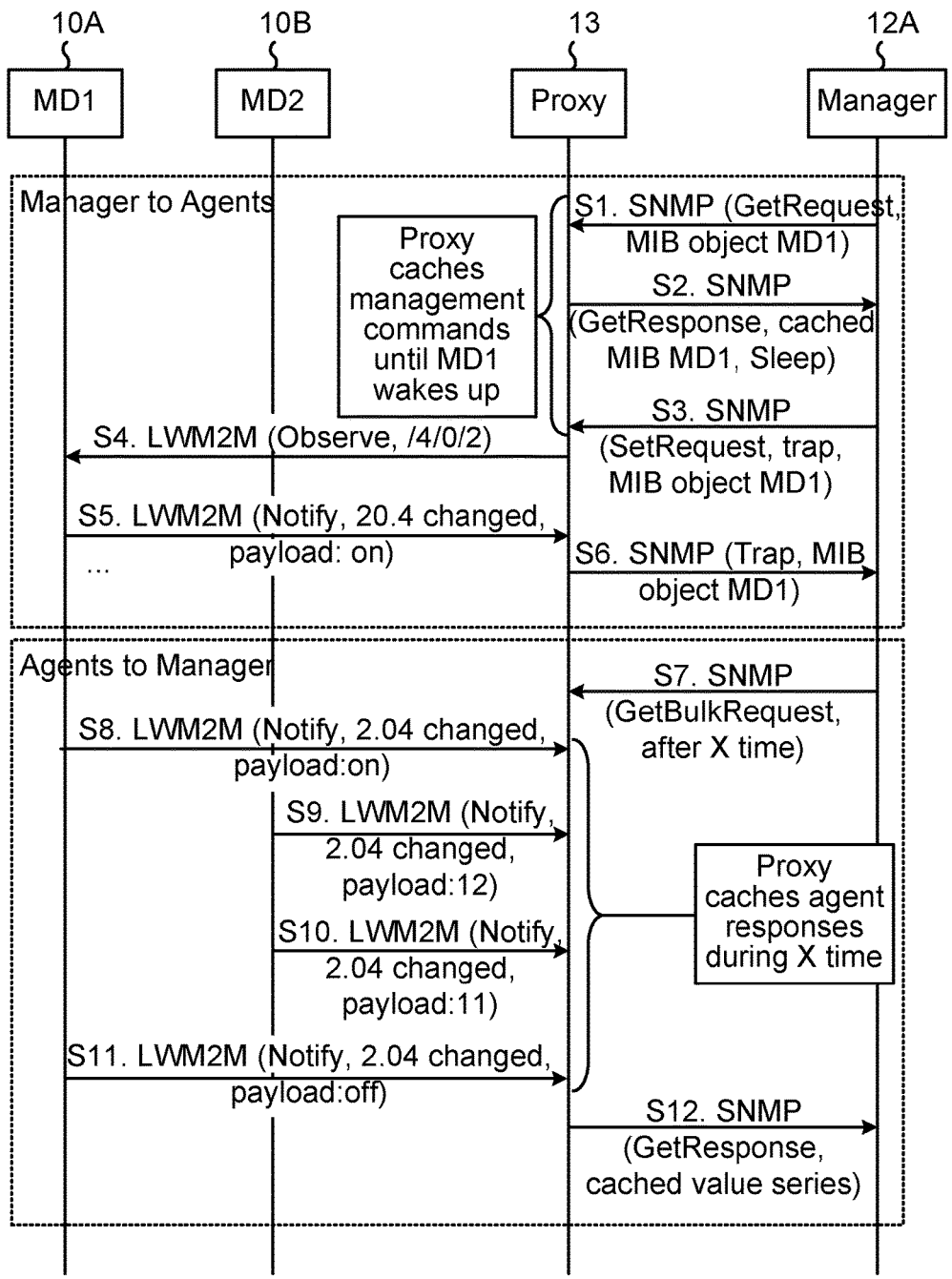
FIG. 3 illustrates a flowchart of an embodiment of the method according to the present invention.

FIG. 3 illustrates a method at a proxy according to an embodiment of the present invention. The proxy 13 receives an SNMP GetRequest from an MTC device manager 12A to retrieve information from a Management Information Base (MIB) of a first MTC device 10A the constrained device. In case the MTC devices 10A, 10B are not powerful enough to run an SNMP agent, the proxy 13 interprets the instructions received from the manager 12A and resolves them to the management protocol of the MTC devices 10A, 10B behind it, for example LWM2M, thus forwarding an LWM2M GET request to a required LWM2M object, i.e. to a particular MTC device. Moreover, if the MTC device 10A is in sleep mode, the proxy 13 will cache the instructions comprised in the GetRequest for a certain amount of time specified in the GetRequest from the manager 12A.

A response procedure from the MTC devices 10A, 10B would be similar. The MTC devices wake up from sleep mode after a certain period of time, perform requested operations and send an LWM2M Notify message to the proxy 13, which receives the multiple Notifications from the MTC devices, merges them, and forwards a single SNMP message to the manager 12A. A detailed description of FIG. 3 follows.

In FIG. 3, the manager 12A sends a request message S1 for the MTC device 10A. However, as the device is sleeping, the proxy 13 replies in S2 on behalf of the device 10A to the manager 12A with the latest cached reading of the requested resource. Next, the manager sends a set trap message S3 for the same resource in the device. This message overrides the previously sent get request message S1 at the proxy 13, and will result in the manager 12A getting the latest reading of the resource. When the MTC device 10A wakes up, the proxy 13 will send the merged message S4 to the device. The message S4 has been translated to the management protocol supported by the MTC device 10A, LWM2M, and during the merging procedure the content of message S1 has been dropped. Thus the message S4 consists of only the content of message S3. The MTC device 10A replies with message S5, which at the proxy 13 is translated to the management protocol supported by the MTC device manager 12A, SNMP, and is forwarded to the manager in message S6.

With further reference to FIG. 3, where the use of SNMP and LWM2M as illustrated by means of example, the manager 12A starts by sending an SNMP Get Request to the proxy 13 for an MIB object within the first MTC device 10A in step S1. The proxy 13 is aware that MTC device 10A is in sleep mode and replies with a standard SNMP GetResponse in step S2 adding the latest cached information from the first MTC device 10A. The proxy 13 can optionally add information about the sleep cycle of the first MTC device 10A or other useful information to the manager 12A if needed. Upon receiving the cached information, the manager 12A decides to send a SetRequest to the proxy 13 containing settings for enabling trap messages (i.e. notifications) from the first MTC device 10A. Depending on the scenario, the proxy 13 may store all the incoming requests from the manager 12A intended for the MTC devices. Depending on policies set in the proxy 13, it will merge and possibly override instructions as previously described. Another example is that illustrated in step S3; after receiving a SetRequest the proxy 13 would override the previously sent GetRequest in step S1, since the new message for instance invalidates the previously sent or effectively comprises the same information to the MTC device manager 12A. The proxy 13 will subsequently translate the SNMP SetRequest to a LWM2M message sent to the first MTC device 10A in step S4.

The MTC device 10A replies to the proxy 13 in step S5 to the LWM2M Observe message received in step S4 informing that an MIB object or resource has changed. The proxy 13 sends in step S6 an SNMP Trap message to the manager 12A, which now subscribes to updates for the MTC device 10A.

Typically, when a plurality of MTC devices 10A, 10B send information to one manager 12A, traffic load will depend on the number of MTC devise rather than on their amount of payload data. The information sent by each individual MTC device is usually rather small, but with thousands of MTC devices, the message overhead can be vast. Therefore, if information requested by the manager 12A is not time-dependent, the manager may choose to "log" the information from the MTC devices 12A, 12B and receive (in case e.g. SNMP is used) a single extensive SNMP Protocol Data Unit (PDU) after a given time period or if predetermined condition is fulfilled. In this example, the manager 12A sends in step S7 an SNMP GetBulkRequest, indicating to the proxy 13 that as much information as possible is requested from a set of MIBs of the various MTC devices after the time period has elapsed or the condition is fulfilled. The manager 12A may specify which MTC device 10A, 10B it wants to listen to, if the utilized protocol allows for such an action. The proxy will cache notifications from the MTC devices 10A, 10B during the given time period in steps S8-S11, and then merge the received data in a single SNMP GetResponse to be sent to the manager 12A in step S12.

Figure 4:
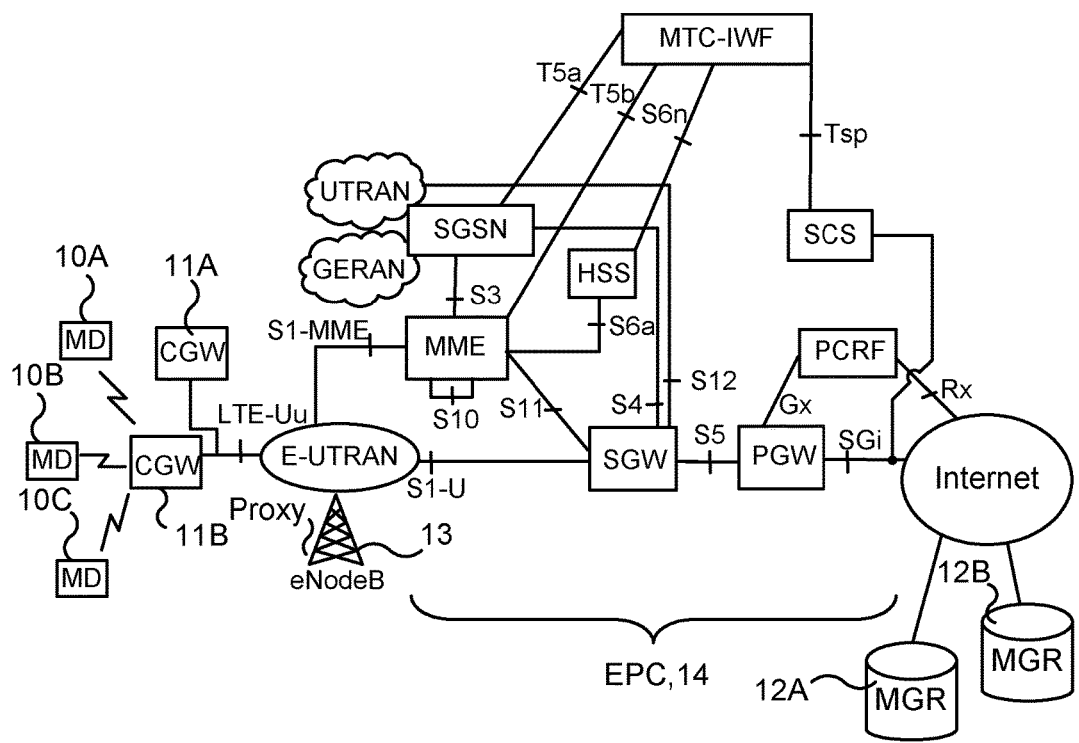
FIG. 4 illustrates a network node according to the present invention implemented in an LTE system.

FIG. 4 shows a schematic overview of an exemplifying wireless communication system in which the present invention can be implemented. The wireless communication system is an LTE based system. It should be pointed out that the terms "LTE" and "LTE based" system is here used to comprise both present and future LTE based systems, such as, for example, advanced LTE systems. It should be appreciated that although FIG. 4 shows a wireless communication system in the form of an LTE based system, the example embodiments herein may also be utilized in connection with any other appropriate communication system, such as e.g. GSM or UMTS, comprising nodes and functions that correspond to the nodes and functions of the system in FIG. 4. An LTE system is herein used as an example only in which the present invention can be implemented.

The LTE system of FIG. 4 is connected to a capillary network. Thus, the MTC devices 10A, 10B, 10C connect to the Evolved Packet Core (EPC) network 14 of the LTE system via one or more of the CGWs 11A, 11B and the eNodeB 13 in the Evolved Universal Terrestrial Radio Access Network (E-UTRAN), and further via the Internet to the application servers 12A, 12B accommodating the MTC device managers 12A, 12B. As in the previously described embodiments, the proxy according to embodiments of the present invention is arranged in the eNodeB 13, but could be implemented in any appropriate network node.

The wireless communication system comprises one or more base stations in the form of eNodeBs, operatively connected to a Serving Gateway (SGW), in turn operatively connected to a Mobility Management Entity (MME) and a Packet Data Network Gateway (PGW), which in turn is operatively connected to a Policy and Charging Rules Function (PCRF). The eNodeB is a radio access node that interfaces with a mobile radio terminal, e.g. a UE or an Access Point, or a CGW (all referred to as "UEs" in the following). The eNodeB of the system forms the E-UTRAN for LTE communicating with the UE over an air interface such as LTE-Uu. The core network in LTE is known as Evolved Packet Core (EPC), and the EPC together with the E-UTRAN is referred to as Evolved Packet System (EPS). The SGW routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). For idle state UEs, the SGW terminates the downlink data path and triggers paging when downlink data arrives for the UE, and further manages and stores UE contexts, e.g. parameters of the IP bearer service, network internal routing information. It also performs replication of the user traffic in case of lawful interception. The SGW communicates with the MME via interface S11 and with the PGW via the S5 interface. Further, the SGW may communicate with the UMTS radio access network UTRAN and with the GSM EDGE ("Enhanced Data rates for GSM Evolution") Radio Access Network (GERAN) via the S12 interface.

The MME is responsible for idle mode UE tracking and paging procedure including retransmissions. It is involved in the bearer activation/deactivation process and is also responsible for choosing the SGW for a UE at the initial attach and at time of intra-LTE handover involving core network node relocation. It is responsible for authenticating the user by interacting with the Home Subscriber Server (HSS). The Non-Access Stratum (NAS) signaling terminates at the MME and it is also responsible for generation and allocation of temporary identities to UEs via the S1-MME interface. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the Serving General Packet Radio Service (GPRS) Support Node (SGSN). The MME also terminates the S6a interface towards the home HSS for roaming UEs. Further, there is an interface S10 configured for communication between MMEs for MME relocation and MME-to-MME information transfer.

The PGW provides connectivity to the UE to external packet data networks (PDNs) by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1X and EvDO). The interface between the PGW and the packet data network, being for instance the Internet, is referred to as the SGi. The packet data network may be an operator external public or private packet data network or an intra operator packet data network, e.g. for provision IP Multimedia Subsystem (IMS) services.

The PCRF determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar.

The PCRF provides the PGW with such rules and/or policies or similar to be used by the acting PGW as a Policy and Charging Enforcement Function (PCEF) via interface Gx. The PCRF further communicates with the packet data network via the Rx interface.

FIG. 4 further illustrates network nodes implemented as proposed in 3GPP TS 23.682 V11.3.0, "3rd Generation Partnership Project; Technical Specification Group Services and System Aspects; Architecture enhancements to facilitate communications with packet data networks and applications (Release 11)", December 2012, which are generally implemented for handling MTC devices in a cellular network. To the general LTE network of FIG. 4, a Machine Type Communication InterWorking Function (MTC-IWF) node and a Services Capability Server (SCS) have been added. A so called Capillary Network Function (CNF) is typically implemented at the SCS level, which SCS is connected to the PGW via the SGi interface, the MTC-IWF via a Tsp interface and to the application servers/MTC device managers 12A, 12B via the Internet or another packet data network, even though the MTC device managers 12A, 12B could be directly connected to the SCS.

Figure 5:
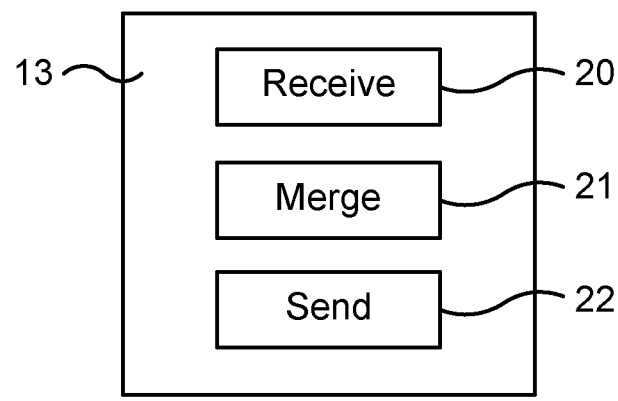
FIG. 5 illustrates a network node according to a further embodiment of the present invention.

FIG. 5 shows a network node 13 according to an embodiment of the present invention, for instance a proxy server. The network node 12 comprises receiving means 20 adapted to receive messages from at least one MTC device manager, merging means 21 adapted to merge the received messages into at least one MTC device message, and sending means 22 adapted to send the at least one MTC device message to an MTC device.

The receiving means 20 and/or the sending means 22 may comprise a communications interface for receiving and providing information to other devices. The network node 13 may comprise a local storage for storing obtained data. The receiving means 20 and/or deriving means 21 and/or sending means 22 may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The receiving means 20 and sending means 22 may comprise one or more transmitters and/or receivers and/or transceivers, comprising analogue and digital components and a suitable number of antennae for radio communication.

Conversely, the network node 13 may be arranged to receive data from an MTC device in response to instructions sent from the network node to the MTC device, which instructions initially was received and merged by the proxy from one or more MTC device managers. The MTC device data is received at the network node and sent to the one or more MTC device managers that initially sent the instructions for the data to the proxy, where a first MTC device manager may receive a first set of requested data, while a second MTC device manager receives a second set of requested data.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method at a network node in a communications network configured to manage messages from at least one Machine Type Communication, MTC, device manager intended for an MTC device, comprising:

receiving the messages from the at least one MTC device manager;

resolving conflicting information included in the received messages;

merging the received messages with the conflicting information resolved into at least one MTC device message; and sending the at least one MTC device message to the MTC device.

2. The method of claim 1, further comprising:

removing duplicate information included in the received messages, wherein the step of merging the received messages further comprises:

merging the received messages with the duplicate information removed into the at least one MTC device message.

3. The method of claim 1, wherein the step of resolving conflicting information comprises:

removing the conflicting information from the received messages.

4. The method of claim 1, wherein the step of resolving conflicting information comprises:

selecting one of at least two conflicting instructions forming the conflicting information, wherein the step of merging the received messages further comprises:

merging the received messages such that the selected conflicting instruction is included in the at least one MTC device message.

5. The method of claim 4, further comprising:

reporting to said at least one MTC device manager the selected conflicting instruction merged into the at least one MTC device message.

6. The method of claim 1, further comprising:

removing outdated information included in the received messages, wherein the step of merging the received messages further comprises:

merging the received messages with the outdated information removed into the at least one MTC device message.

7. The method of claim 1, further comprising:

determining whether the at least one MTC device manager is authorized to communicate with the MTC device, and if so, merging the received messages into the at least one MTC device message.

8. The method of claim 1, further comprising:

sending a confirmation to the at least one MTC device manager that the messages have been received and will be sent to the MTC device.

9. The method of claim 1, further comprising:

determining whether the MTC device is in sleep mode, wherein the at least one MTC device message is sent to the MTC device when the MTC device exits the sleep mode.

10. A network node in a communications network configured to manage messages from at least one Machine Type Communication, MTC, device manager intended for an MTC device, comprising a processing unit and a memory, said memory containing instructions executable by said processing unit, whereby said network node is operative to:

receive the messages from the at least one MTC device manager;

resolve conflicting information included in the received messages;

merge the received messages with the conflicting information resolved into at least one MTC device message; and send the at least one MTC device message to the MTC device.

11. The network node of claim 10, further being operative to:
   remove duplicate information included in the received messages; and
   merge the received messages with the duplicate information removed into the at least one MTC device message.

12. The network node of claim 10, further being operative to: remove the conflicting information from the received messages.

13. The network node of claim 10, further being operative to:
   select one of at least two conflicting instructions forming the conflicting information; and
   merge the received messages such that the selected conflicting instruction is included in the at least one MTC device message.

14. The network node of claim 13, further being operative to:
   report to said at least one MTC device manager the selected conflicting instruction merged into the at least one MTC device message.

15. The network node of claim 10, further being operative to:
   remove outdated information included in the received messages; and
   merge the received messages with the outdated information removed into the at least one MTC device message.

16. The network node of claim 10, further being operative to:
   determine whether the at least one MTC device manager is authorized to communicate with the MTC device, and if so, merging the received messages into the at least one MTC device message.

17. The network node of claim 10, further being operative to:
   send a confirmation to the at least one MTC device manager that the messages have been received and will be sent to the MTC device; and or
   determine whether the MTC device is in sleep mode, wherein the at least one MTC device message is sent to the MTC device when the MTC device exits the sleep mode.

18. A network node in a communications network configured to manage messages from at least one Machine Type Communication, MTC, device intended for an MTC device manager, comprising a processing unit and a memory, said memory containing instructions executable by said processing unit, whereby said network node is operative to:
   receive the messages from the at least one MTC device;
   resolve conflicting information included in the received messages;
   merge the received messages with the conflicting information resolved into at least one MTC device manager message; and
   send the at least one MTC device manager message to the MTC device manager.

19. The network node of claim 18, further being operative to:
   remove duplicate information included in the received messages; and
   merge the received messages with the duplicate information removed into the at least one MTC device message.

* * * * *